(12) United States Patent
Hall et al.

(10) Patent No.: US 7,884,772 B2
(45) Date of Patent: Feb. 8, 2011

(54) RADAR APPARATUS AND ALIGNMENT SENSOR

(75) Inventors: Richard R. Hall, Baldwinsville, NY (US); Stanley M. Granat, Clay, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 777 days.

(21) Appl. No.: 11/800,600

(22) Filed: May 7, 2007

(65) Prior Publication Data

US 2008/0278386 A1 Nov. 13, 2008

(51) Int. Cl.
G01R 29/08 (2006.01)
H01Q 3/00 (2006.01)
H01Q 3/12 (2006.01)

(52) U.S. Cl. ............... 343/703; 343/760; 343/761

(58) Field of Classification Search ............ 343/703, 343/757, 761, 760
See application file for complete search history.

(56) References Cited

U.S. PATENT DOCUMENTS

| | | | |
|---|---|---|---|
| 6,266,581 B1 * | 7/2001 | Wheatley et al. ............ | 700/302 |
| 6,608,601 B1 | 8/2003 | Collinson et al. | |
| 6,714,156 B1 | 3/2004 | Ibrahim et al. | |
| 6,933,883 B2 | 8/2005 | Isaji | |
| 2003/0182025 A1 * | 9/2003 | Tseng et al. ............... | 701/1 |
| 2005/0030219 A1 * | 2/2005 | Friedrich et al. ............ | 342/68 |
| 2005/0093866 A1 | 5/2005 | Ebert | |
| 2006/0103927 A1 * | 5/2006 | Samukawa et al. ......... | 359/436 |
| 2008/0030398 A1 * | 2/2008 | Nakamura ................. | 342/118 |
| 2008/0077325 A1 * | 3/2008 | Bye et al. .................. | 701/220 |

FOREIGN PATENT DOCUMENTS

JP 2002-168941 * 6/2002

OTHER PUBLICATIONS

"A Linear/Angular Interferometer Capable of Measuring Large Angular Motion", Ji-hua Zhang et al 1999 Meas. Sci. Technol. 10 1247-1253 doi:10.1088/0957 0233/10/12/317, Coordinate Metrology and Measurement Laboratory (CMML), Department of Mechanical Engineering, The Ohio State University, Columbus, OH 43 210, USA.

* cited by examiner

*Primary Examiner*—Shih-Chao Chen
(74) *Attorney, Agent, or Firm*—Howard IP Law Group, PC (57) ABSTRACT

A radar apparatus including: a radar antenna array; and, a sensor for detecting a relative distortion of at least one portion of the radar antenna relative to at least one other portion of the radar antenna array.

24 Claims, 10 Drawing Sheets

RADAR APPARATUS AND ALIGNMENT SENSOR

FIELD OF INVENTION

The present invention relates generally to radar systems and more specifically to a system and method for detecting and/or correcting radar antenna distortion.

BACKGROUND

Radio detection and ranging, commonly known as radar is used to detect and track a target object or objects. Radar systems typically emit electromagnetic energy and detect reflection of the emitted energy scattered by the target object. By analyzing time difference of arrival, Doppler shift and other changes in the reflected energy, the location and movement of the target object can be determined.

Phased array antenna systems employ a plurality of individual antenna elements or subarrays of antenna elements that are separately excited. Radiated energy from each of the individual antenna elements or subarrays is of a different phase, respectively, so that an equiphase beam front or cumulative wave front of electromagnetic energy radiating from the array travels in a selected direction. Differences in phase or timing among the antenna activating signals determines the direction in which the cumulative beam from the antenna is transmitted. Analysis of the phases of return beams of electromagnetic energy detected by the individual antennas in the array similarly allows determination of the direction from which a return beam arrives. Such processing is well known to those of ordinary skill in the art.

Figure 1:
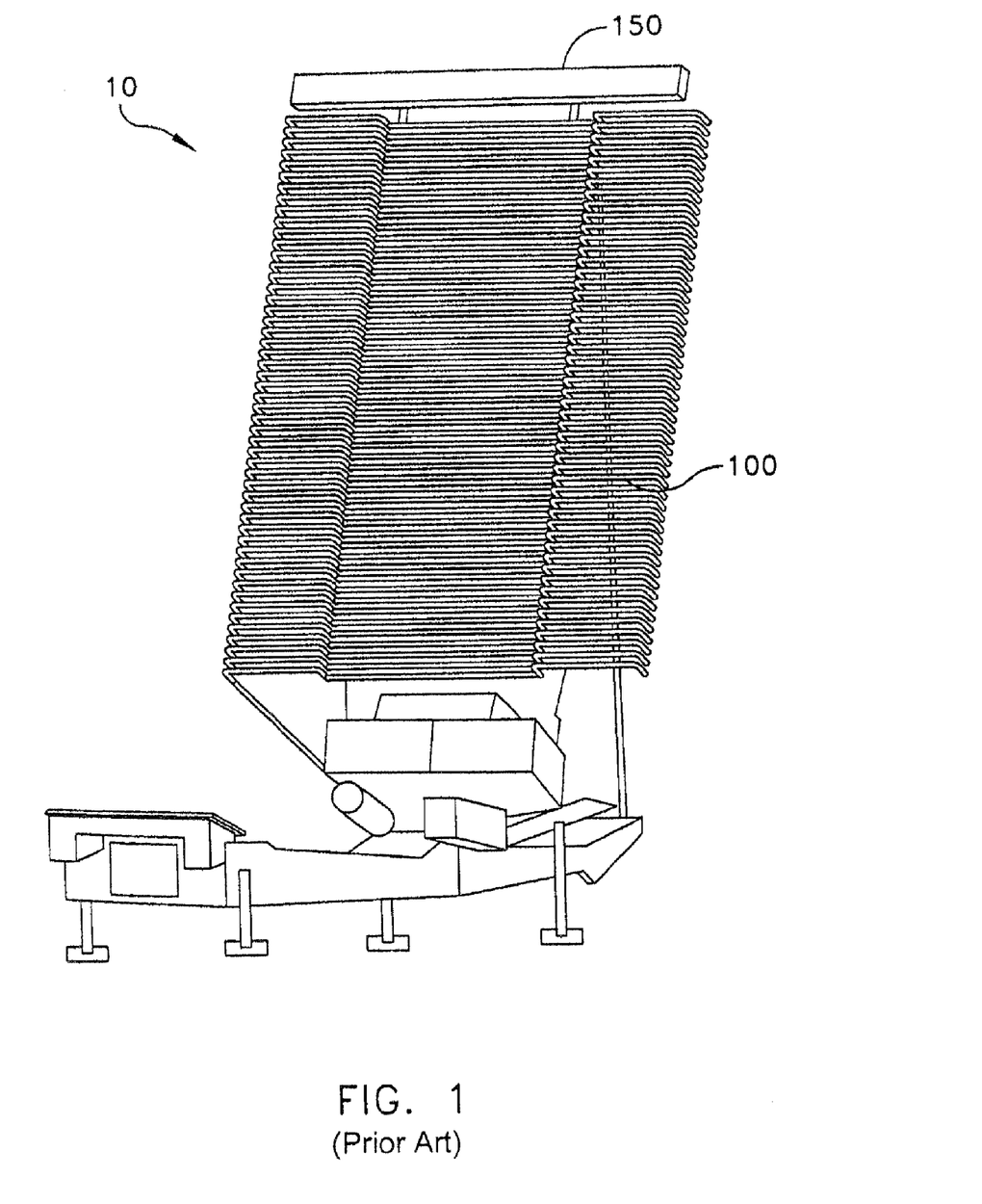
FIG. 1 illustrates a perspective view of a radar antenna structure useful for implementing embodiments of the present invention.
Figure 2A:
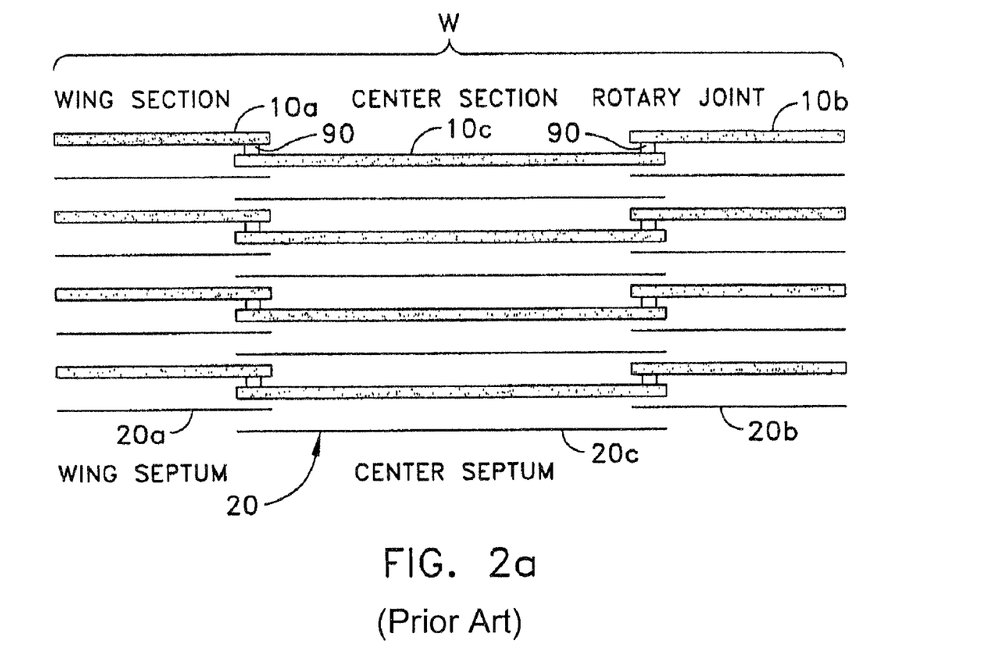
FIGS. 2a and 2b illustrate cross-section views of a portion of the antenna structure of FIG. 1 in first and second states.
Figure 2B:
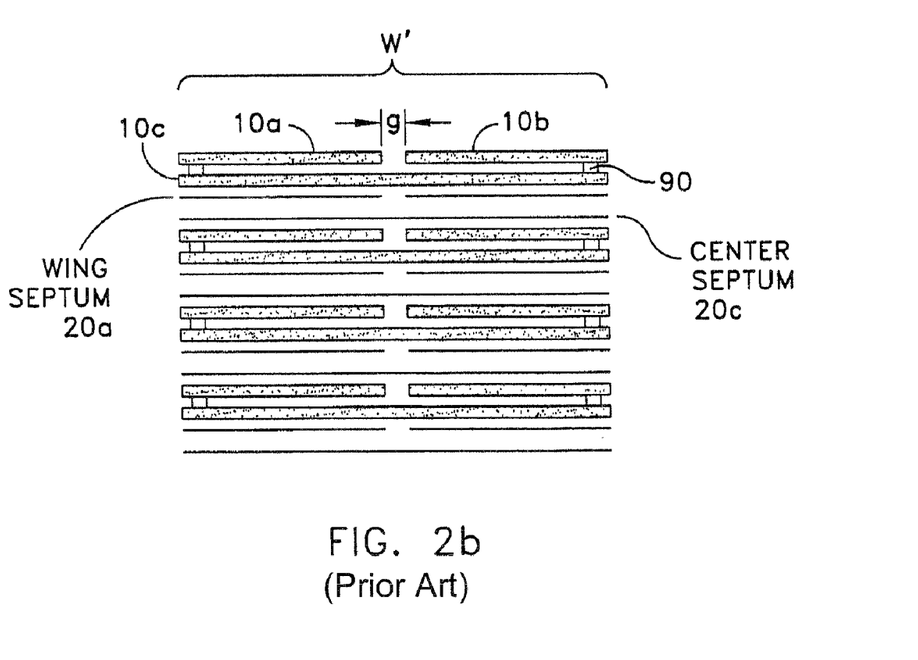

Referring now to FIG. 1, there is shown a conventional radar apparatus 10. Radar apparatus 10 includes an Integrated Friend or Foe (IFF) or Secondary Surveillance Radar (SSR) antenna 150 physically bolted to the upper surface of a substantially planar Primary Surveillance Radar (PSR) antenna structure 100. The illustrated radar apparatus 10 shows an SSR/PSR arrangement for the AN/TPS-59 system manufactured by Lockheed Martin Corporation.

Where apparatus 10 is portable in nature, antenna structure 100 may fold—to facilitate stowage and transport. Referring now also to FIG. 2A, there is shown a schematic illustration of a folded PSR antenna structure, such as the AN/TPS-59 PSR antenna, in a deployed or operational configuration or state. FIG. 2B schematically depicts the same PSR antenna as shown in FIG. 2A in a folded configuration or state, so as to facilitate transport, for example. The illustrated PSR antenna 100 includes three modules or sections. The "wing" sections 10a, 10b of the linear arrays are vertically offset from the center section 10c and connected thereto by two rotary joints 90. The rotary joints 90 operate in conventional fashion to enable the "wing" sections to fold and interleave with the center section and provide an array in the transport configuration shown in FIG. 2B. The wing sections are sized and coupled via the rotary joints in an appropriate manner so that a slight gap (g) exists between the wing sections in transport mode, so as to avoid damage to the array. Septum 20 is similarly segmented in wing sections 20a, 20b and center section 20c and operates in similar manner. For the TPS-59 radar array in transport configuration, the width w' (FIG. 2B) is less than 96 inches wide (in contrast to the width w in deployed mode, which is about 192 inches or 16 feet wide). PSR antenna structure 100 may be on the order of about 20 feet tall.

Where apparatus 10 is portable in nature, it is desired to be lightweight. Accordingly, light-weight materials are often utilized in antenna structure 100. Further, as can be seen in FIG. 1, antenna structure 100 has a significant cross-sectional area, as compared to the depth of antenna structure 100. Due, at least in part, to the lightweight nature of antenna structure 100, and its significant cross-section, antenna structure 100 may be prone to internal stresses that cause it to distort, e.g., bend or shift under torque. This may occur with or without external stimulus. For example, a portion of structure 100 may distort relative to another portion of structure 100 over time due to its shear size. Further, structure 100 may be particularly prone to distort when subjected to external loading, such as wind loads, heating loads resulting from solar radiation and/or vibration induced loads, all by way of non-limiting example only.

When structure 100 distorts, the individual antenna elements change their relative position—causing errors or even failures in their transmission/reception, such as undesirable side-lobes. Even a slight change in element orientation from the intended operating plane of antenna structure 100 is amplified significantly at the significant operating distances of radar antennas, e.g., 100 miles or more.

By way of further, non-limiting example only, a 3-piece radar structure, as is shown in FIGS. 2a, 2b, has transmitters in all 3 sections. The sections must maintain a substantially constant plane from initial deployment of the system. If any of the 3 pieces deviate from this plane, the resulting error will impact the accuracy of the system.

One possible cause of distortion of structure 100 may come from a combination of play in the hinges 90 and the deflection of the wing sections, which allows the wing sections to displace out of the plane of the center section. Another possible cause of distortion is when the center section is twisted out of it's original plane by external forces, e.g., wind loads.

Accordingly, it is desired to detect and/or mitigate undesired distortions in the structure of radar array antennas.

SUMMARY OF THE INVENTION

A radar apparatus including: a radar antenna array; and, a sensor for detecting a relative distortion of at least one portion of the radar antenna relative to at least one other portion of the radar antenna array.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein.

DETAILED DESCRIPTION OF THE PREFERRED EMBODIMENTS

It is to be understood that the figures and descriptions of the present invention have been simplified to illustrate elements that are relevant for a clear understanding, while eliminating, for the purpose of clarity, many other elements found in radar systems and methods of making and using the same, control systems and methods of making and using the same, and actuator systems and methods of making and using the same. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein.

According to an embodiment of the present invention, a feedback of the relative position of portions or segments of a radar antenna structure may be provided. By measuring the magnitude of antenna distortions, distortion induced errors can be compensated for—electronically via signal processing and/or physically via antenna biasing. An example of suitable signal processing is to adjust the phasing of individual elements of an antenna structure to mitigate the sensed distortions. Alternatively, or in addition thereto, an indication of a level of confidence may be provided, based upon sensed distortions.

According to an embodiment of the present invention, there is provided a method to measure the amount of distortion in a radar antenna both prior and/or after deployment. Exemplary causes of loads that may induce antenna distortion include, by way of example only: handling damage, transportation damage, wind, snow, solar heating and ice. According to an embodiment of the present invention, there is provided an antenna apparatus having a distortion sensor.

According to an embodiment of the present invention, laser interferometry may be used to monitor a radar antenna structure for physical distortion. Such an interferometer system monitors the deflection of the structure as it revolves or rotates during operation. In an exemplary configuration, the optical path used for inteferometry is oriented along the plane of the antenna structure. Substantially continuous measurements may be made during the operation. In another exemplary configuration, an optical source remote from the antenna plane may be utilized to measure out of plane distortions of an interferometric system.

By way of further explanation, the basis of interferometry is the reinforcement and cancellation of (electromagnetic) waves to determine differences between the input waves, such as relative traveled distance. An exemplary interferometric approach suitable for use with the present invention is discussed in "A Linear/Angular Interferometer Capable Of Measuring Large Angular Motion", Ji-hua Zhang et al 1999 Meas. Sci. Technol. 10, 1247-1253. This article presents a linear and angular interferometric heterodyne system, capable of measuring large angular motion. The interferometric system has a high linear-displacement resolution of 1.24 nm while the angular-displacement resolution can reach 0.0025 arcsec. By combining the advantages of the interferometer with a retroreflector and the interferometer with a plane-mirror reflector, the discussed interferometric measurement system allows a desirable transverse motion and rotational motion along any of the three orthogonal directions. Using a retroreflector with a diameter of 38.1 mm, the translational range in the transverse directions is no less than 20 mm×10 mm, while the angular range along any axis is no less than 10°.

Alternatively, other conventional interferometric approaches may be utilized.

Figure 3:
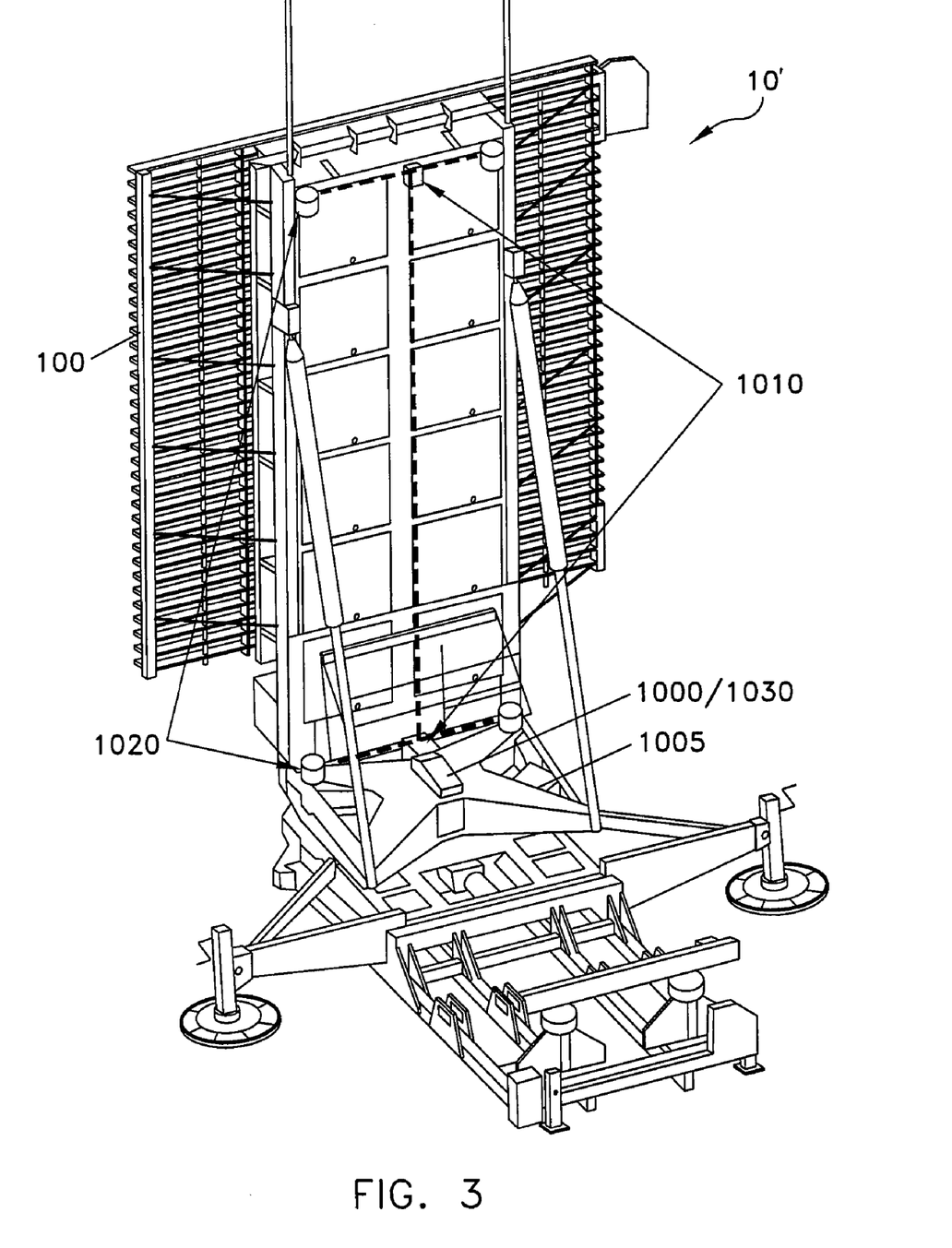
FIG. 3 illustrates a perspective view of a radar apparatus according to an embodiment of the present invention.

Referring now to FIG. 3, there is shown a rear-view of a radar apparatus 10' analogous to radar apparatus 10 of FIG. 1. SSR antenna 150 has been omitted for purposes of illustration. The embodiment of FIG. 3 additionally includes an electromagnetic radiation source 1000. In the illustrated embodiment of FIG. 3, source 1000 is secured to support 1005, which supports structure 100, and rotates with structure 100.

In different embodiments of the present invention, source 1000 takes the form of narrow- and broad-spectrum light sources. In one embodiment, source 1000 takes the form of one or more conventional laser sources. In another embodiment, source 1000 takes the form of one or more conventional LED sources, such as one or more conventional super-LED sources. In one embodiment of the present invention, source 1000 takes the form of a helium neon laser, and has a central apparatus wavelength of and an intensity sufficient to permit detection by the optical receiver (e.g., photodiodes or photoelectrodes).

Referring still to FIG. 3, emissions from source 1000 are free-space coupled into beam-splitters 1010. Beam splitters 1020 free-space couple the source 1000 emissions to reflectors 1020. In one embodiment of the present invention, beam splitters 1010 each take the form of a polarizing/non-polarizing glass corner cube reflector.

Reflectors 1020 may take the form of a retro-reflector or corner cube reflector. By way of further explanation only, a retro-reflector is a device that reflects light back from the direction it came from, regardless of the angle of incidence—unlike a flat mirror. Source 1000 emissions reflected from the reflectors 1020 may be directed to a number of interferometers 1030 substantially co-located with source 1000 via independent optical paths, such as via beam splitters 1020 or other optical elements, such as other reflectors and/or beam splitters. According to an embodiment of the present invention, there may be a same number of interferometers 1030 as reflectors 1020, to allow for independent measurement of the distances to each of the reflectors 1020 from source 1000. By comparing each of the distances to previously determined distances, it may be determined whether the antenna structure is distorted relative to a prior condition.

Beam splitters 1010 may incorporate modulators to enable emissions from source 1000 to selectively impinge ones of reflectors 1020, and reflect back to one or more interferometers for measurement in a sequenced manner.

According to an embodiment of the present invention, reflectors 1020 may have wavelength specific operating characteristics, such as Bragg reflectors that reflect light of a given central wavelength. In such a configuration, reflections of source 1000 emissions may be essentially wavelength multiplexed in their return route. They may be wavelength demultiplexed, and used to determine distances traveled in a conventional manner.

It should be understood that while four reflectors 1020, two beam splitters 1010, and a single source/interferometer assembly 1010/1030 are shown, other numbers of such elements may be used in practice, depending upon design criteria.

Figure 4:
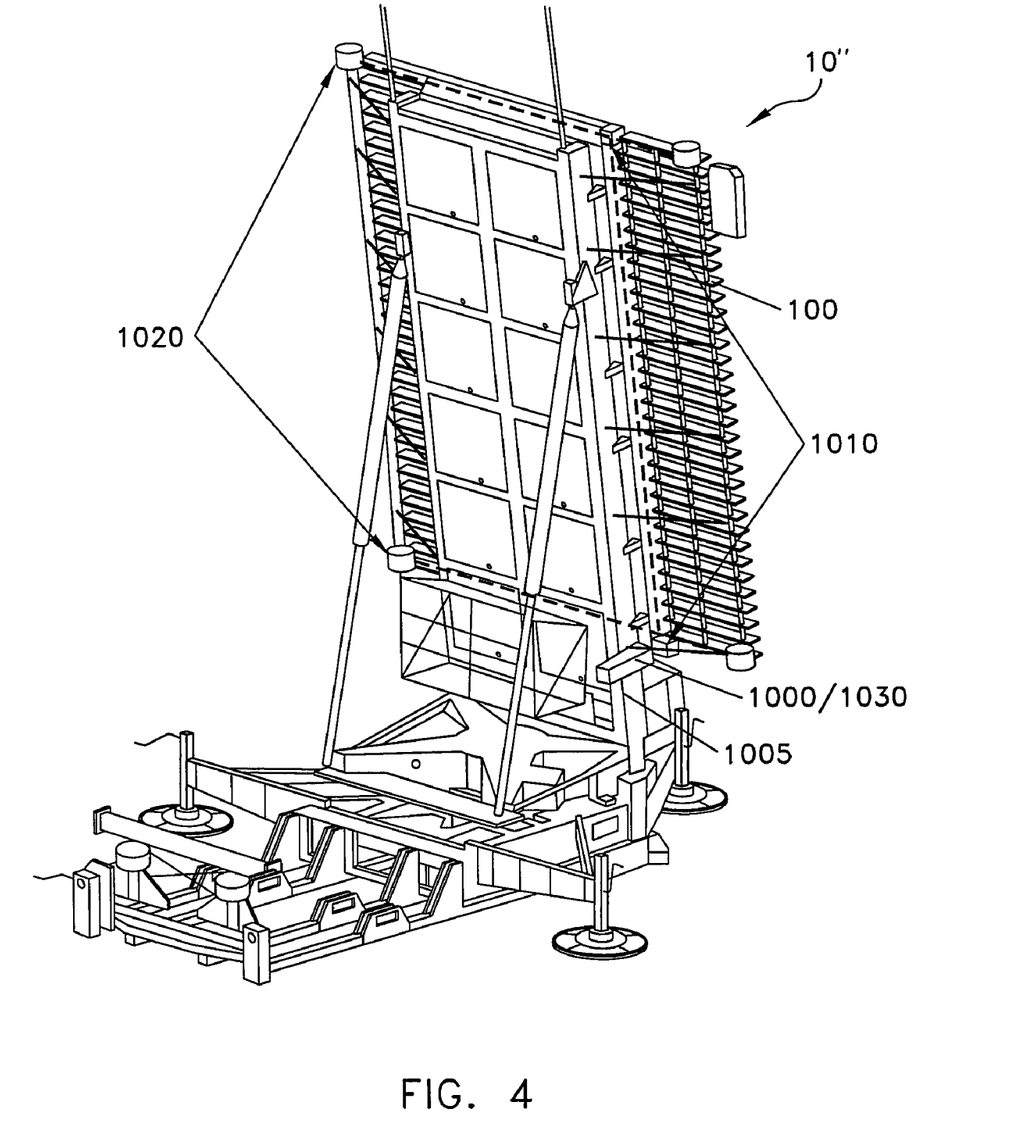
FIG. 4 illustrates a perspective view of a radar apparatus according to an embodiment of the present invention.

Referring now also to FIG. 4, there is shown a rear-view of a radar apparatus 10" analogous to radar apparatus 10' of FIG. 3. Like elements have been designated with like references and are not further described for purposes of brevity. In the embodiment of FIG. 4, source/interferomtery assembly 1010/1030 is positioned on a different support 1005.

Figure 5:
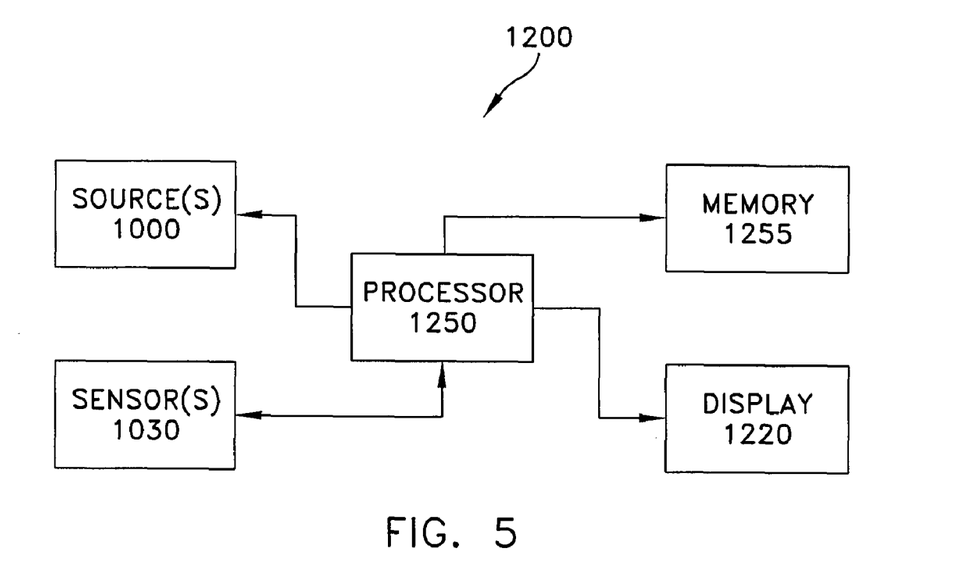
FIG. 5 illustrates a block diagram of a system according to an embodiment of the present invention.

Referring now to FIG. 5, there is shown a block diagram of a system 1200 according to an embodiment of the present invention. System 1200 includes source 1000. System 1200 also includes one or more sensors for measuring distances to various points of a radar antenna array (e.g., interferometer(s) 1030). System 1200 also includes a processor 1250 operatively coupled to source 1000 and sensor 1030.

For non-limiting purposes of explanation, a processor (as used herein) generally includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, generally refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may take the form of internal or external disc drives, for example. Memory may be internal or external to an integrated unit including a processor. In the illustrated embodiment of FIG. 5, memory 1255 is external to processor 1250. Memory 1255 preferably stores a computer program or code, e.g., a sequence of instructions being operable by processor 1250. Other configurations may be employed in lieu or addition to processor 1250, such as an Application Specific Integrated Circuit (ASIC).

System 1200 further includes a display 1220. The display may take the form of any conventional user display device, such as a conventional CRT or LCD based display, for example.

Figure 6:
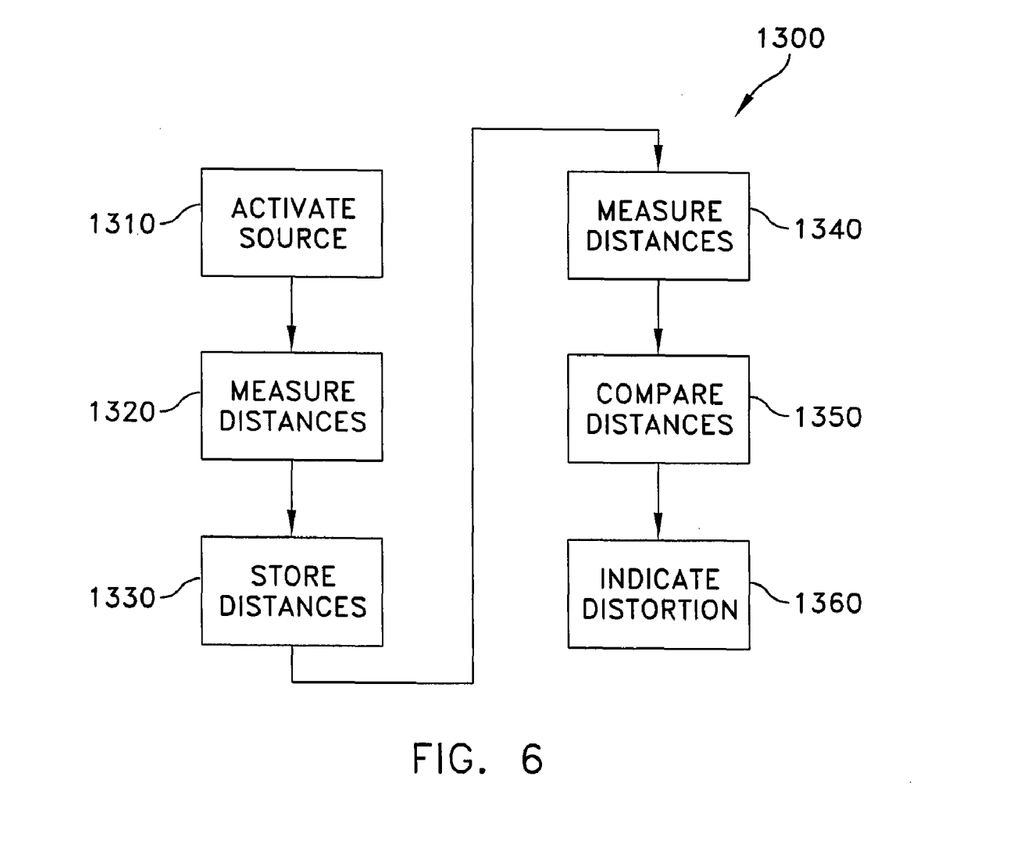
FIG. 6 illustrates a flow diagram of a process suitable for use with the system of FIG. 5 and according to an embodiment of the present invention.

Referring now also to FIG. 6 in conjunction with FIG. 5, there is shown a flow diagram of a process suitable for use with system 1200 and according to an embodiment of the present invention. Processor 1250 executable code suitable for practicing process 1300 may be stored in memory 1255. Process 1300 commences with processor 1250 activating source 1000—which causes emissions to impinge sensor 1030 after traversing to and from particular locations along the radar antenna structure. At block 1302, a plurality of distances to the particular locations along the radar antenna are determined by processor 1250—such as by interfering reflected source 1000 emissions with a local version of the source 1000 emissions using an interferometric approach, and determining the relative delay in the reflected emissions, respectively. At block 1330, processor 1250 stores data indicative of the measured distances, such as in memory 1255. At block 1340, the distances are again measured—akin to block 1320. At block 1350, processor 1250 compares the distances measured at block 1340 to the distances stored at block 1330. At block 1360, if the distances are determined to not be substantially identical by the comparing at block 1350, distortion is indicated, such by using display 1220.

According to an embodiment of the present invention, the indication provided at block 1360 may be indicative of a confidence level, such as 70%, 80% or 90%, by way of non-limiting example only. Such a confidence level may be determined by processor 1250 dependently upon a likelihood received signals are erroneous, due to likely side-lobing resulting from sensed antenna distortion, for example. Alternatively, or in addition thereto, an indication of the amount of sensed distortion may be provided at block 1360.

Figure 7:
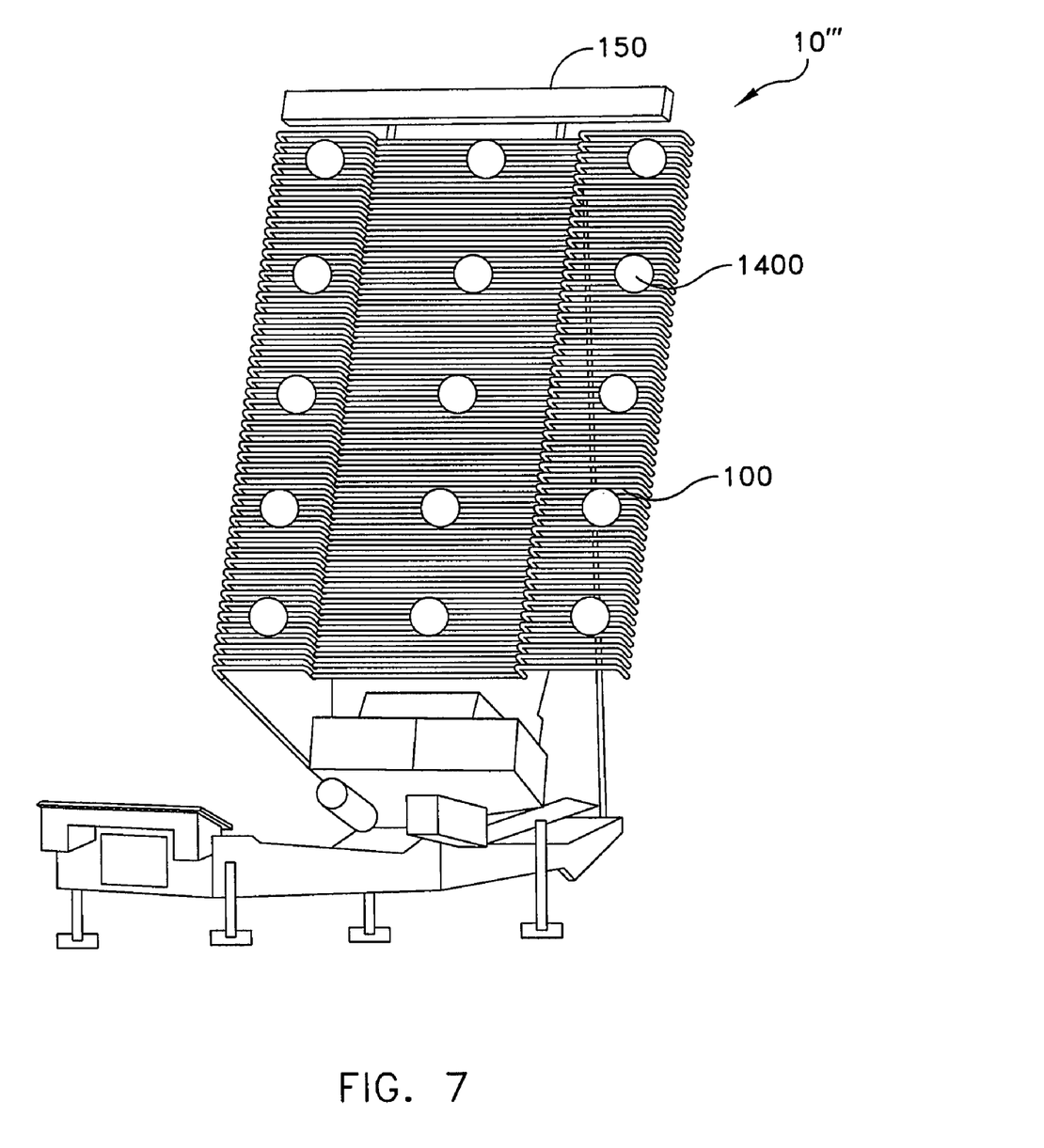
FIG. 7 illustrates non-limiting examples of various sensing positions on a radar antenna structure suitable for use with the present invention.

Referring now to FIG. 7, there are shown exemplary points 1400 (15 points, for example) for mounting sensors 1030. In some embodiments, source 1000 may take the form of a power source for activating the sensor 1030, as opposed to an optical source.

According to an embodiment of the present invention, sensed radar antenna distortion can be used as a feedback to reposition portions of the radar antenna. As discussed hereinabove, the relative distortion between different portions of a radar antenna structure may be detected or measured. The relative distortion may be used to re-position portions of the radar antenna structure to mitigate the sensed distortion.

Figure 8:
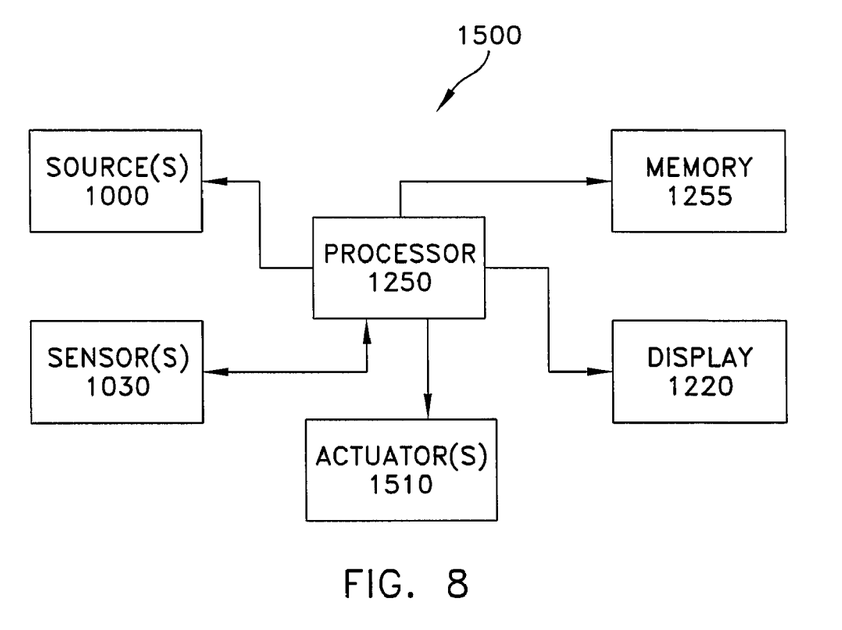
FIG. 8 illustrates a block diagram of a system according to an embodiment of the present invention.

Referring now to FIG. 8, there is shown a block diagram of another system 1500 according to an embodiment of the present invention. Like elements in systems 1500, 1200 (FIG. 5) are designated using like references, and further discussion of such elements is omitted for brevity. System 1500 additionally includes one or more actuators 1510. Actuators 1510 may be physically coupled to, and/or between portions of the antenna structure to physically bias or stress them, responsively to a sensed antenna structure distortion. Actuators 1510 may be selectively activated to mitigate sensed distortions. For example, and referring now again to FIG. 2a, one or more actuators may be coupled to sections 10b, 10c, optionally incorporated with rotary joint 90. Upon detection of distance changes indicative of section 10c being rotated in a first direction relative to section 10b, the actuator may be activated to apply a stress that biases section 10c in a second rotating direction, opposite of the first rotating direction, thereby mitigating antenna distortion resulting from the sensed rotating of section 10c relative to 10b. According to an embodiment of the present invention, the actuators may be inter- and/or intrasection coupled. Actuators 1510 may take the form of any suitable biasing configuration, such as electrical, hydraulic, pneumatic biasing configurations.

Figure 9:
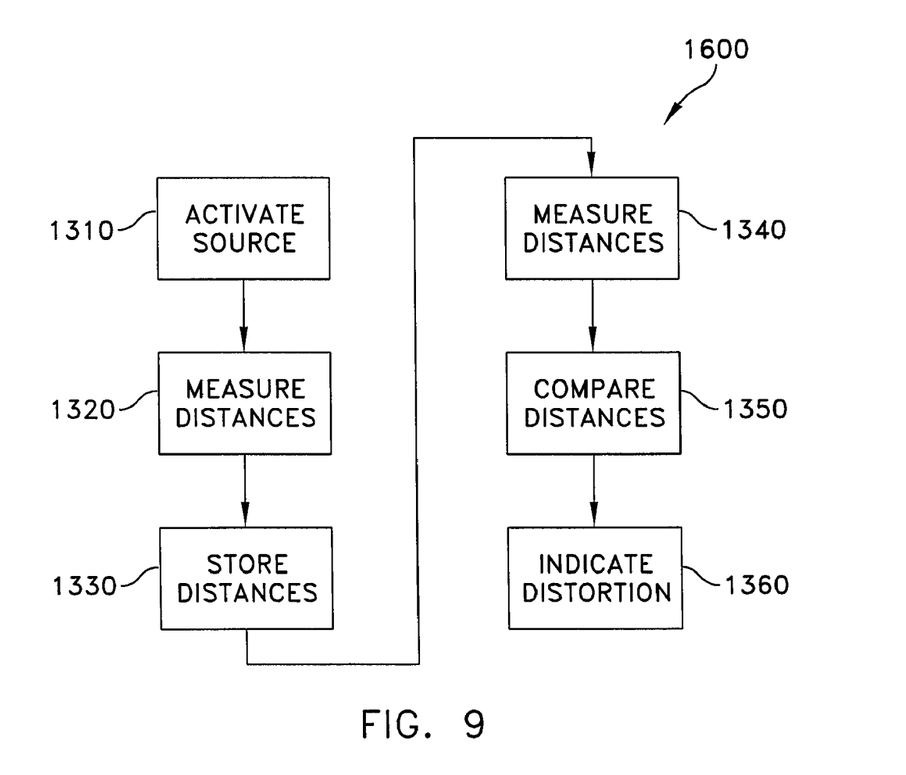
FIG. 9 illustrates a flow diagram of a process suitable for use with the system of FIG. 8 according to an embodiment of the present invention.

Referring now also to FIG. 9, there is shown a flow diagram of a process 1600 suitable for use with system 1500 of FIG. 8 and according to an embodiment of the present invention. Like elements in processes 1600, 1300 (FIG. 6) are designated using like references, and further discussion of certain elements are omitted herein for brevity. At block 1610, actuators 1510 are selectively operated responsively to distance differences determined or measured by the comparing at block 1350 by processor 1250.

Figure 10:
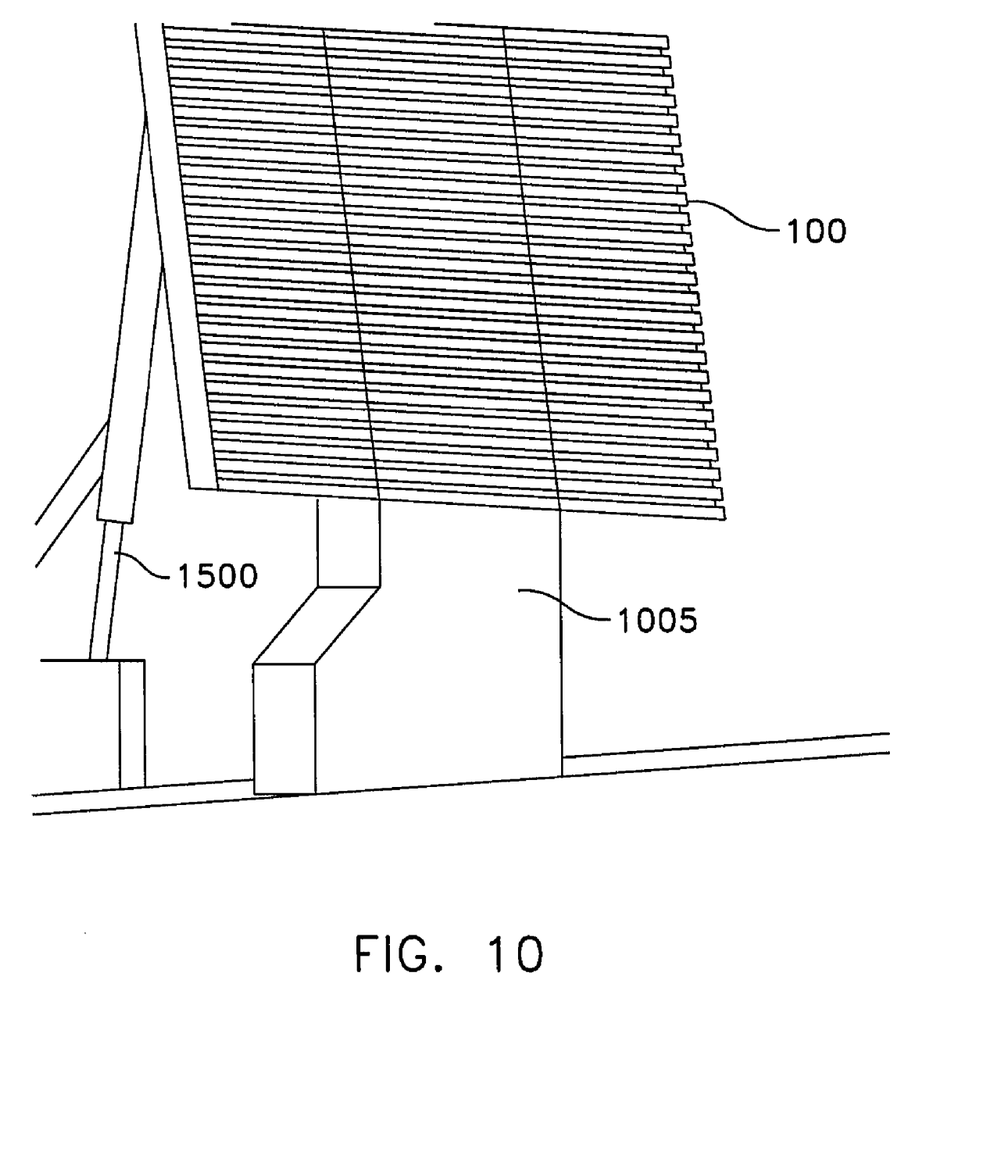
FIG. 10 illustrates a perspective view of a portion of a radar apparatus according to an embodiment of the present invention.

Referring now also to FIG. 10, there is shown a perspective view of a portion of an antenna structure 100 supported by a mount 1005. According to an embodiment of the present invention, one or more actuators 1500 may be incorporated into structural elements that either support antenna structure 100 and/or are used to position antenna structure 100.

According to an embodiment of the present invention, other types of sensors may be used as sensors 1030 (FIGS. 5, 8). Non-limiting examples include: load cells measuring applied pressures at various points of the antenna structure, strain gages positioned at various points on the antenna structure, photo detector arrays, such as quadrant detectors, measuring displacement (of detected spots relative to target spots of source 1000 emissions, for example) and/or accelerometers positioned at various points on the antenna structure. Such applications would utilize a mathematical mapping of a predetermined array position such that sensor detections for measured displacement would be measured relative to the predetermined mapping data in order to deduce or infer the relative displacement.

Figure 11:
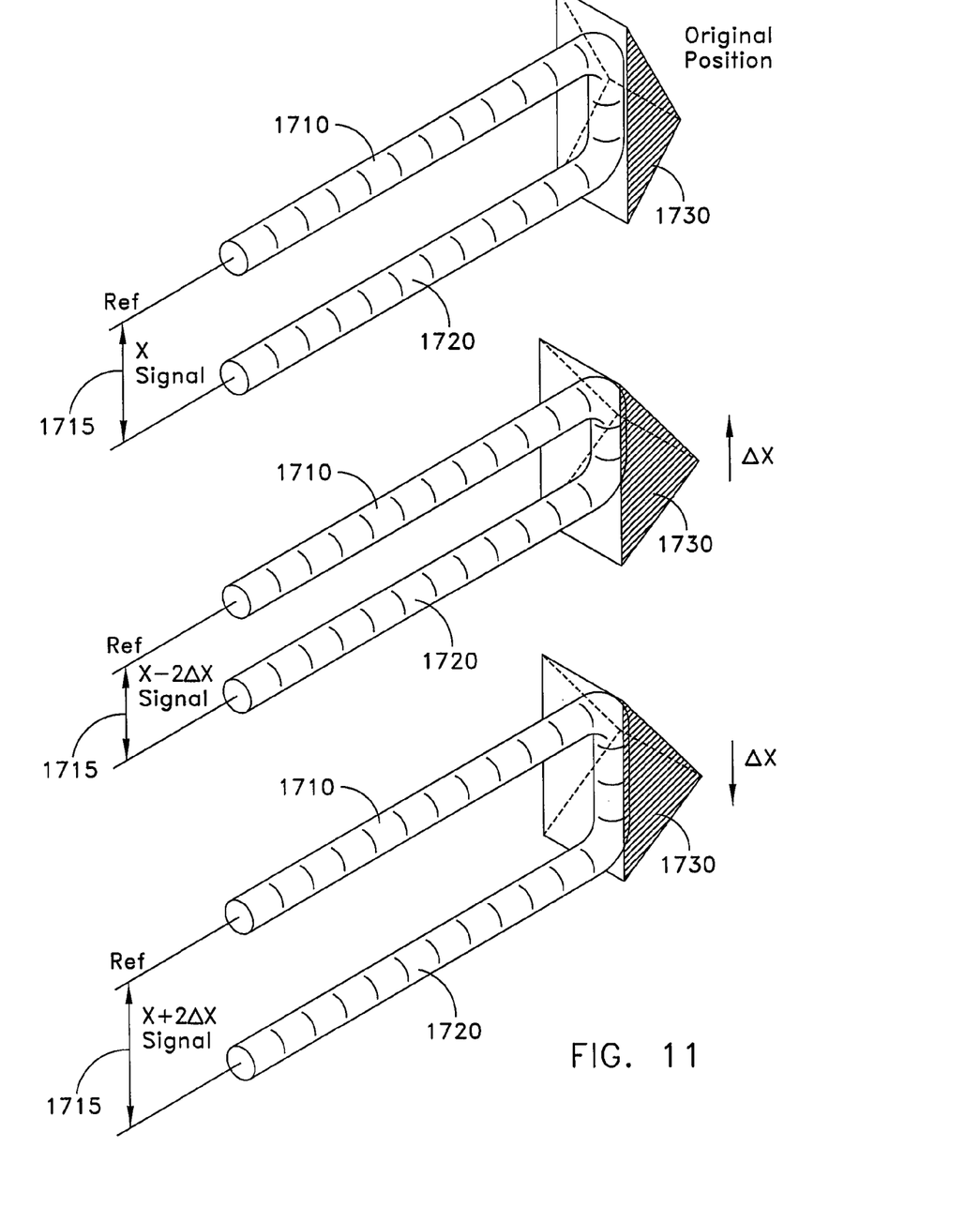
FIG. 11 illustrates a configuration for detecting displacement of a portion of a radar antenna according to an embodiment of the present invention.

Referring now also to FIG. 11, there is shown a configuration suitable for use with one or more laser sources and one or more quadrant detectors or 2-dimensional arrays of photodiodes, for example. In the configuration of FIG. 11, a reference beam 1710 (such as being emitted from a source 1000, FIGS. 5, 8) impinges on a reflector 1730 (that may be positioned analogously to reflectors 1030, FIGS. 3, 4, for example). Reflector 1730 is geometrically configured to reflect beam 1730 so as to impinge a quadrant detector or a diode array at a given location being a certain distance 1715 from reference beam 1710. Reflector 1730 is geometrically configured such that when the reflector is displaced by a distance ΔX, the impinging point of reflected beam 1720 shifts by an amount 2ΔX. An exemplary configuration of reflector 1730 is a corner cube reflector. In embodiments of the present invention, multiple reflectors and/or quadrant detectors and/or photodiode arrays may be positioned and oriented at various points on a radar antenna to detect three-dimensional distortion of the antenna array. For example, three such reflectors and quadrant detectors or photodiode arrays may be positioned at the locations shown in FIG. 7, with one combination being oriented in an X-axis, another in a Y-axis and the third in a Z-axis. The outputs of the quadrant detectors or photodiode arrays may be provided to a processor (e.g., processor 1250, FIGS. 5, 8).

Figure 12:
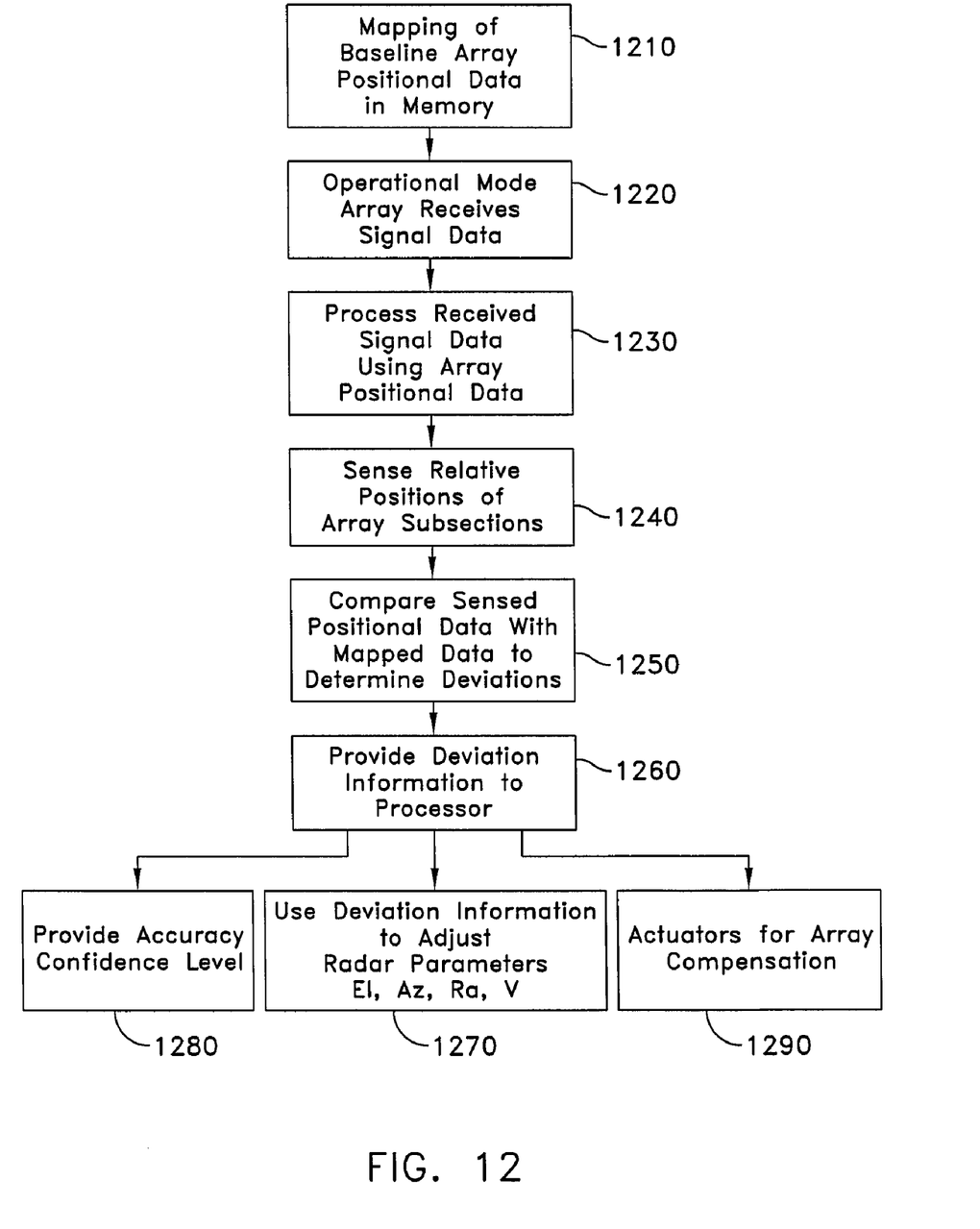
FIG. 12 illustrates an exemplary operational process flow for sensing array positional distortion and performing compensation according to an embodiment of the present invention.

Referring now to FIG. 12, there is shown another exemplary process flow for sensing array structure positional deviation and providing feedback and/or compensation for radar parameters according to an aspect of the present invention. As shown in FIG. 12, a mapping of an idealized or baseline set of array positions of an array structure in the deployed mode of operation is stored in memory (block 1210). This mapping may be performed at various times and locations such as during initial calibration at the factory, initial setup or deployment in the field, or other conditions such as field calibration testing, initial startup, or other such baseline conditions.

The radar antenna array is then operated in its deployed mode to receive signal data (block 1220) and the return signal data is processed (block 1230) using the array position data stored in memory from block 1210. The sensing system embodied in the present invention is adapted to sense or detect array positions (block 1240) such portions or subsection positions of the array relative to the pre-stored array position data from block 1210. The system then compares (block 1250) the sensed position data from block 1240 with the mapped array position data from block 1210 to determine deviations in array position data. The resulting deviation or offset data is provided to the processor (block 1260). The processor operates by utilizing the deviation information to adjust array parameter data such as elevation, azimuth, range and velocity so as to compensate the array output (block 1270) based on the array position distortion, and/or provide a confidence level (block 1280) with respect to accuracy of the array data relative to the baseline array position information. For example, in an exemplary configuration, output from regarding the relative accuracy of the received radar signals based on the comparison of the sensed positional data with the baseline data may be sent to a monitor for display to an operator, for example. In another configuration, the processor may optionally output a signal for causing one or more actuators on the array structure to reposition portions of the array so as to counteract the distortions (block 1290). In still another configuration, the processor output may be used to compensate or bias algorithms that operate to determine radar parameters utilizing the received radar signal data and the baseline array positional data so as to electronically or algorithmically counteract the relative degree of distortion sensed by the sensing system and thereby provide a more accurate radar output (block 1270).

There are numerous potential advantages to systems according to the present invention. Such a feedback system can be used for alignment during manufacturing, calibration, and maintenance in the field. The level of manufacturing precision (e.g., alignment, calibration) of the radar assembly may be relaxed with such an error compensation. There may be provided substantially continuous feedback monitoring of the radar antenna structure that detections change over time, such as due to damage and wear, and may additionally be used to track hardware reliability. Radar systems in remote locations of the world can be monitored for reliability and proper operation, by providing a remote communication module, such as a modem, to system 1300 and/or 1600. Materials less expensive than composite materials may be able to be used more reliably for antenna structures. And, the precision of radar performance may be improved with such a feedback system.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. For example, while embodiments of the invention have been described with regard to a planar antenna array structure, it is understood that the antenna array may take other geometric forms, including but not limited to parabolic arrays, spherical arrays and cylindrical arrays. Such array configurations are intended to be within the scope of the present invention. It is therefore contemplated that the appended claims will cover any such modifications or embodiments as fall within the true scope of the invention.

What is claimed is:

1. A radar apparatus comprising:
   a radar antenna array;
   a sensor for detecting a relative distortion of at least one portion of the radar antenna array relative to at least one other portion of the radar antenna array;
   at least one source of electromagnetic radiation emissions, and
   a plurality of reflectors coupled to the radar antenna array and positioned to reflect emission from the at least one source to the sensor.

2. The radar apparatus of claim 1, wherein the sensor comprises at least one interferometer.

3. The radar apparatus of claim 1, wherein the sensor comprises a plurality of interferometers.

4. The radar apparatus of claim 1, further comprising at least one processor coupled to the sensor.

5. The radar apparatus of claim 1, wherein the sensor comprises at least one photo detector array coupled to the radar antenna array.

6. The radar apparatus of claim 1, wherein the radar antenna array is substantially planar, and the sensor detects radar antenna variation therefrom.

7. A radar apparatus comprising:
- a radar antenna array;
- a sensor for detecting a relative distortion of at least one portion of the radar antenna array relative to at least one other portion of the radar antenna array; and
- at least one actuator coupled to the antenna array and responsive to the sensor to mitigate at least one sensed distortion.

8. The radar apparatus of claim 7, wherein the sensor comprises a plurality of load cells coupled to the radar antenna array.

9. The radar apparatus of claim 7, wherein the sensor comprises a plurality of strain gages coupled to the radar antenna array.

10. The radar apparatus of claim 7, wherein the sensor comprises at least one quadrant detector coupled to the radar antenna array.

11. The radar apparatus of claim 7, wherein the sensor comprises a plurality of accelerometers coupled to the radar antenna array.

12. A method for use with a radar antenna array, comprising:
- detecting a relative distortion of at least one portion of the radar antenna array relative to at least one other portion of the radar antenna array;
- providing an output dependently upon the detecting, and
- outputting a confidence level indicator representing the estimated accuracy of received signals as a function of detected distortion.

13. The method of claim 12, further comprising biasing the radar antenna array responsively to the output.

14. The method of claim 12, wherein the output is indicative of an amount of detected distortion.

15. The method of claim 12, wherein the detecting comprises:
- determining distances to a plurality of points on the radar antenna array; and,
- comparing the distances to known distances.

16. An alignment sensing system for a radar antenna array comprising:
- a sensor arrangement operatively coupled to the radar antenna array, the sensor arrangement comprising at least one interferometer responsive to at least one electromagnetic radiation source, the sensor arrangement sensing deviations in positions of one or more of the portions of said array relative to a set of predetermined positions associated with said one or more portions and generating signals indicative of said deviations; and
- a processor responsive to said signals output from said sensor arrangement for adjusting radar parameters to compensate for said sensed deviations in position of said array.

17. The system of claim 16, wherein said adjusted radar parameters include one or more of elevation, azimuth, range and velocity.

18. The system of claim 16, wherein said sensor arrangement comprises at least one reflector.

19. The system of claim 16, wherein the radar antenna array comprises a foldable antenna array.

20. The system of claim 16, wherein the at least one electromagnetic radiation source is generally co-located with the at least one interferometer.

21. A radar apparatus comprising:
- a radar antenna array;
- a sensor for detecting a relative distortion of at least one portion of the radar antenna array relative to at least one other portion of the radar antenna array;
- at least one processor coupled to the sensor, the processor configured to output a confidence level indicator representing the estimated accuracy of received signals as a function of detected distortion.

22. The system of claim 18, wherein the at least one reflector comprises a plurality of reflectors.

23. The system of claim 22, wherein the at least one interferometer comprises a plurality of interferometers, each interferometer configured to receive an electromagnetic signal reflected off at least one of the plurality of reflectors.

24. The system of claim 22, further comprising at least one beam splitter, the at least one beam splitter responsive to the at least one radiation source for providing an electromagnetic signal to each of the plurality of reflectors.

* * * * *